(12) United States Patent
Han

(10) Patent No.: US 12,162,541 B2
(45) Date of Patent: Dec. 10, 2024

(54) MOTOR ASSEMBLY AND STEERING APPARATUS FOR VEHICLE HAVING THE SAME

(71) Applicant: HL Mando Corporation, Pyeongtaek-si (KR)

(72) Inventor: JeongHwa Han, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 242 days.

(21) Appl. No.: 17/665,937

(22) Filed: Feb. 7, 2022

(65) Prior Publication Data

US 2022/0250672 A1 Aug. 11, 2022

(30) Foreign Application Priority Data

Feb. 9, 2021 (KR) .................. 10-2021-0017984

(51) Int. Cl.
*B62D 5/04* (2006.01)
*H02K 7/10* (2006.01)

(52) U.S. Cl.
CPC ......... *B62D 5/0403* (2013.01); *B62D 5/0448* (2013.01); *H02K 7/1004* (2013.01)

(58) Field of Classification Search
CPC ...... H02K 7/1004; H02K 7/1016; H02K 5/04; H02K 7/003; H02K 7/006; B62D 5/0403; B62D 5/0448; B62D 5/0424; B62D 5/04; B62D 5/0412
See application file for complete search history.

(56) References Cited

U.S. PATENT DOCUMENTS 5,527,227 A * 6/1996 Asai ................. F16H 55/44
474/166

FOREIGN PATENT DOCUMENTS

| CN | 112217316 A | * | 1/2021 |
| KR | 20140113818 A | * | 3/2013 |
| KR | 20200100938 A | * | 8/2020 |

OTHER PUBLICATIONS

KR20200100938A English translation (Year: 2023).*
CN112217316A English translation (Year: 2023).*
KR20140113818A English translation (Year: 2023).*

* cited by examiner

Primary Examiner — Christopher M Koehler
Assistant Examiner — Viswanathan Subramanian
(74) Attorney, Agent, or Firm — Hauptman Ham, LLP

(57) ABSTRACT

According to embodiments of the present disclosure, it is possible to easily adjust the tension of the belt, and simplify the motor installation structure in the steering system, and share a motor between vehicle types.

13 Claims, 14 Drawing Sheets

MOTOR ASSEMBLY AND STEERING APPARATUS FOR VEHICLE HAVING THE SAME

CROSS REFERENCE TO RELATED APPLICATION

This application claims priority from Korean Patent Application No. 10-2021-0017984, filed on Feb. 9, 2021, which is hereby incorporated by reference for all purposes as if fully set forth herein.

TECHNICAL FIELD

The present embodiments of the present disclosure relate to a motor assembly and a steering apparatus of a vehicle including the same, more particularly, relate to a motor assembly capable of easily adjusting a belt tension and simplifying the motor installation structure and assembly process in the steering system, and capable of sharing the motor between vehicle models, and a vehicle steering apparatus with the same.

In a structure for transferring the torque of the motor, a belt and a pulley are often used to reduce the torque of the motor to the driven part. In this case, since the belt tension may be loosened, it is necessary to maintain the belt tension to prevent the pulley from spinning.

In particular, a steering apparatus of a vehicle may include a motor for generating a torque to assist a driver's steering torque, or steering a wheel corresponding to a driver's steering torque, or generating a steering reaction force to improve a driver's steering feeling. A general steering apparatus has a structure in which a motor is coupled to a housing eccentrically with respect to a motor shaft, rotates with respect to the housing, and maintains the tension of a belt connecting the motor shaft and a pulley. Alternatively, there may be used a structure in which a pulley supported on the outer surface of the belt is installed, the belt is pressed by the pulley, and the tension of the belt is maintained.

However, in the structure of assembling the motor eccentrically, it is difficult to manufacture since a screw hole having a circumferential slit shape is required to be provided in the housing to rotate the motor. In addition, there is a problem in that it is cumbersome to use a different type of motor for each vehicle model in consideration of interference with peripheral parts and a motor installation space. In addition, the structure including the pulley supported on the outer surface of the belt has a problem in that the number of parts increases and the assembly process is complicated since it is required to further include a pulley as well as a motor.

SUMMARY

In this background, embodiments of the present disclosure provide a motor assembly capable of easily adjusting a belt tension and simplifying the motor installation structure and assembly process in the steering system, and capable of sharing the motor between vehicle models, and a vehicle steering apparatus with the same.

In an aspect of the present disclosure, there is provided a motor assembly including a motor including a motor shaft including a large-diameter portion and a small-diameter portion extending from one end of the large-diameter portion, a first support member formed in a hollow and provided on a first side of an outer surface of the small-diameter portion, and an outer diameter of which decreases from one side to another side, a second support member formed in a hollow shape and provided on a second side of the outer surface of the small-diameter portion, and an outer diameter of which increases from one side to another side, a pulley which is formed in a hollow shape, includes a plurality of slits for cutting an inner surface and an outer surface, and includes, in the inner surface, a first tapered surface supported on an outer surface of the first support member and a second tapered surface supported on an outer surface of the second support member, a nut coupled to one end of the small-diameter portion, a first elastic member provided between the nut and the first support member, and a second elastic member provided between the second support member and the large-diameter portion.

In another aspect of the present disclosure, there is provided a motor assembly including a motor including a motor shaft including a large-diameter portion and a small-diameter portion extending from one end of the large-diameter portion, a support member formed in a hollow shape and provided on an outer surface of the small-diameter portion, the outer diameter of which decreases from one side to another side, a pulley which is formed in a hollow shape, includes a plurality of slits for cutting an inner surface and an outer surface, and includes, in the inner surface, a tapered surface supported on an outer surface of the support member and a step portion formed with a diameter enlarged at an end of the tapered surface and supported by the large-diameter portion, a nut coupled to one end of the small-diameter portion, and an elastic member provided between the nut and the support member.

In another aspect of the present disclosure, there is provided a steering apparatus of a vehicle including the motor assembly, a sliding bar having both ends connected to a tie rod and a knuckle arm, a housing accommodating the sliding bar and coupled to a motor of the motor assembly, a ball nut coupled to an outer surface of the sliding bar via a ball and coupled to a driven pulley, and a belt coupled to a pulley included in the motor assembly and the driven pulley.

In another aspect of the present disclosure, there is provided a steering apparatus of a vehicle including the motor assembly, a steering column including a steering shaft, to which a motor of the motor assembly is coupled, a driven pulley coupled to the steering shaft, and a belt coupled to a pulley included in the motor assembly and the driven pulley.

According to embodiments of the present disclosure, it is possible to easily adjust the tension of the belt, and simplify the motor installation structure in the steering system, and share a motor between vehicle types.

DETAILED DESCRIPTION

Figure 1:
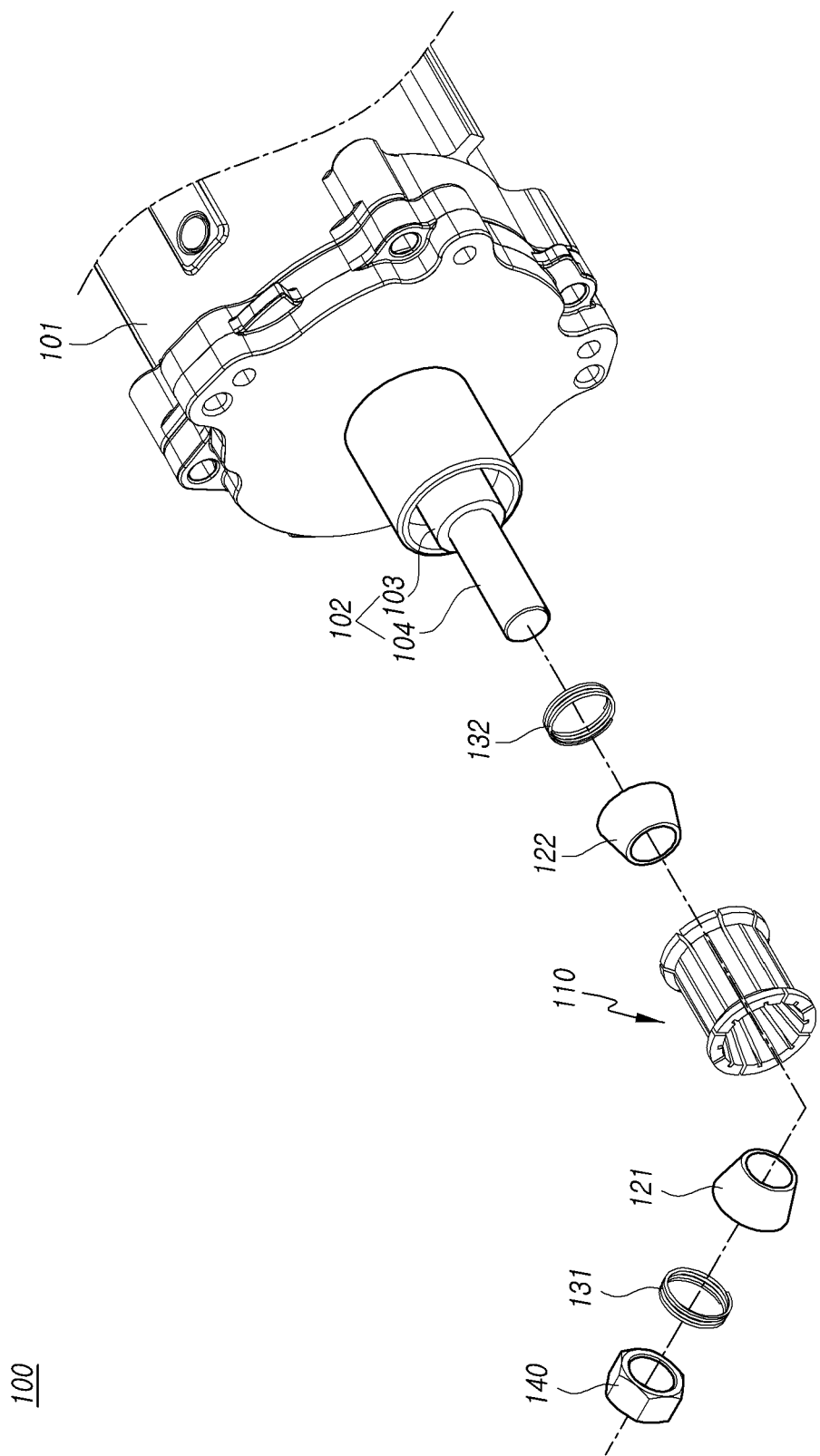
FIG. 1 is an exploded perspective view of a motor assembly according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
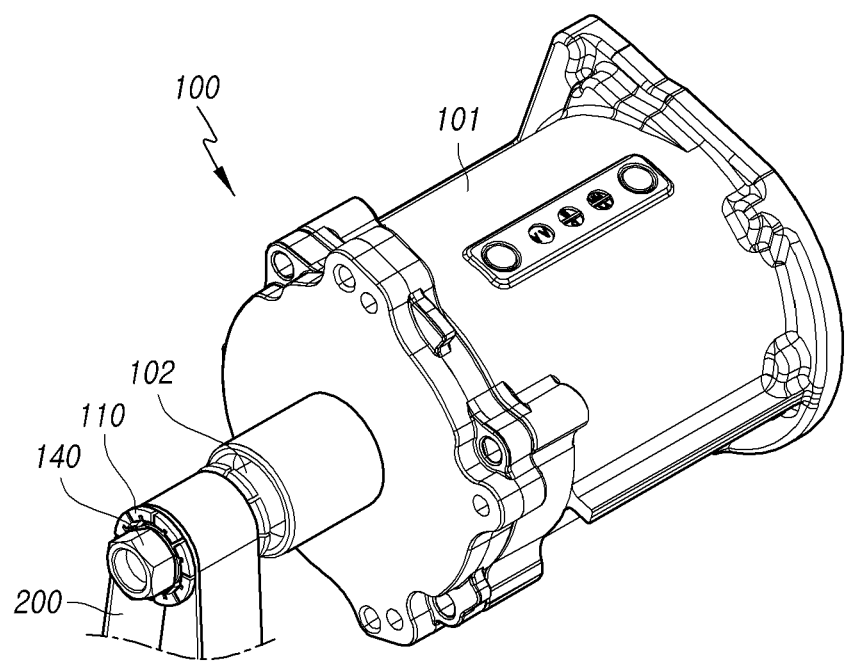
FIG. 2 is a perspective view illustrating an example of use of a motor assembly according to the present embodiments.
Figure 3:
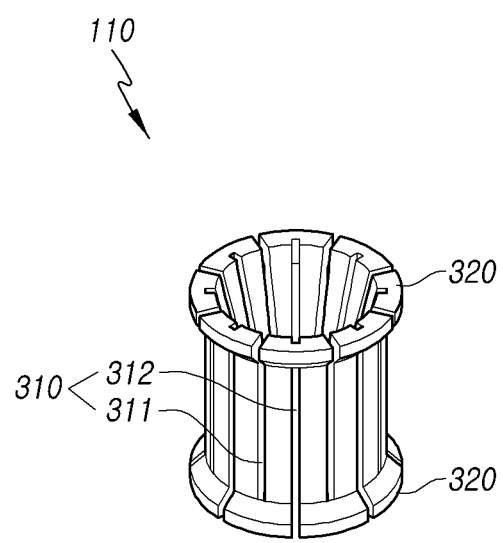
FIGS. 3 to 4 are perspective views of a part of a motor assembly according to the present embodiments.
Figure 4:
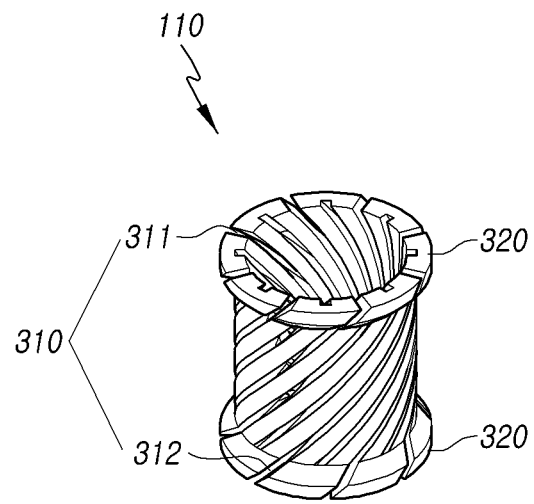
Figure 5:
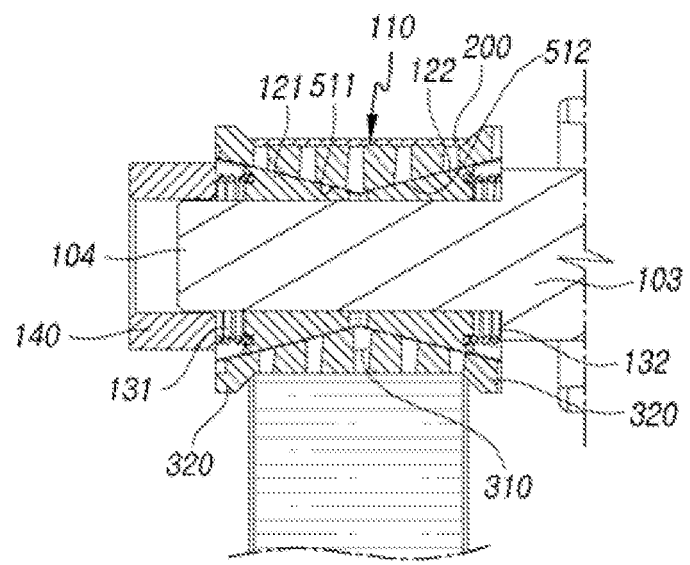
FIG. 5 is a cross-sectional view of a part of a motor assembly according to the present embodiments.
Figure 6:
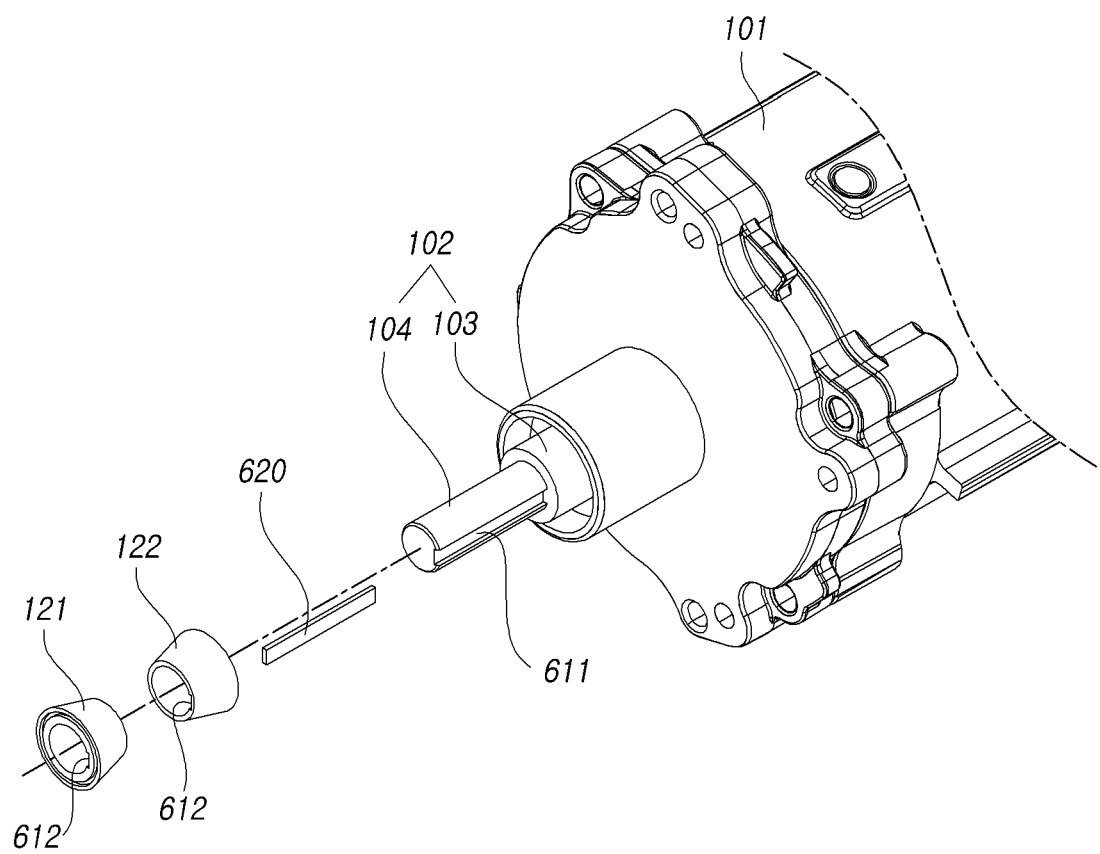
FIG. 6 is an exploded perspective view of a part of a motor assembly according to the present embodiments.
Figure 7:
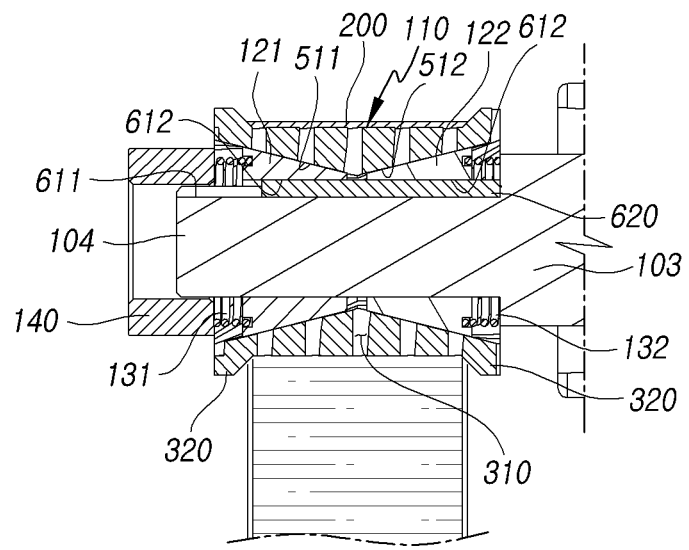
FIG. 7 is a cross-sectional view of a part of a motor assembly according to the present embodiments.
Figure 8:
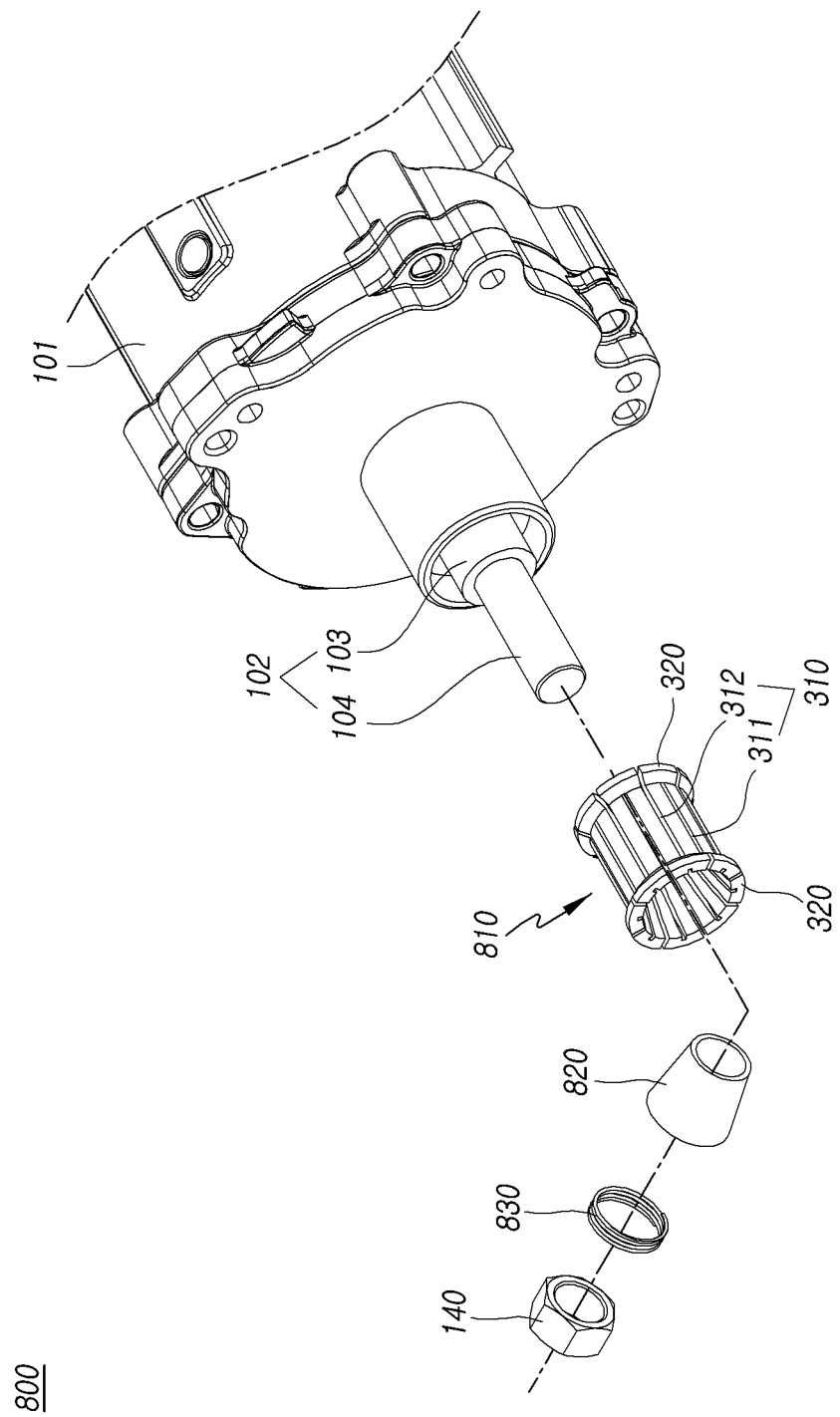
FIG. 8 is an exploded perspective view of a motor assembly according to the present embodiments.
Figure 9:
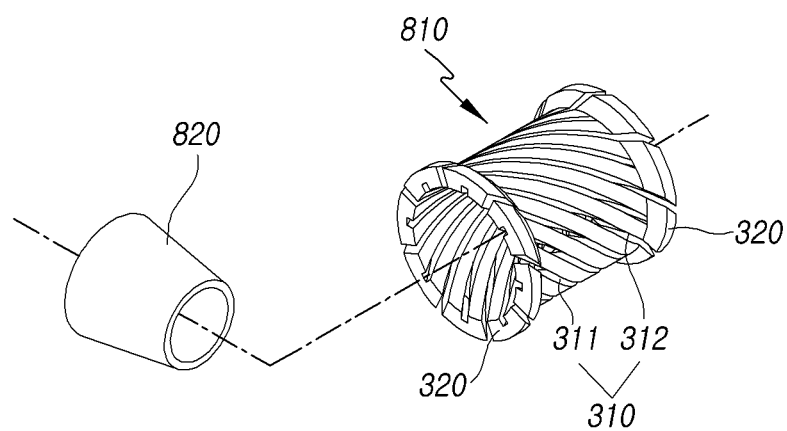
FIG. 9 is an exploded perspective view of a part of a motor assembly according to the present embodiments.
Figure 10:
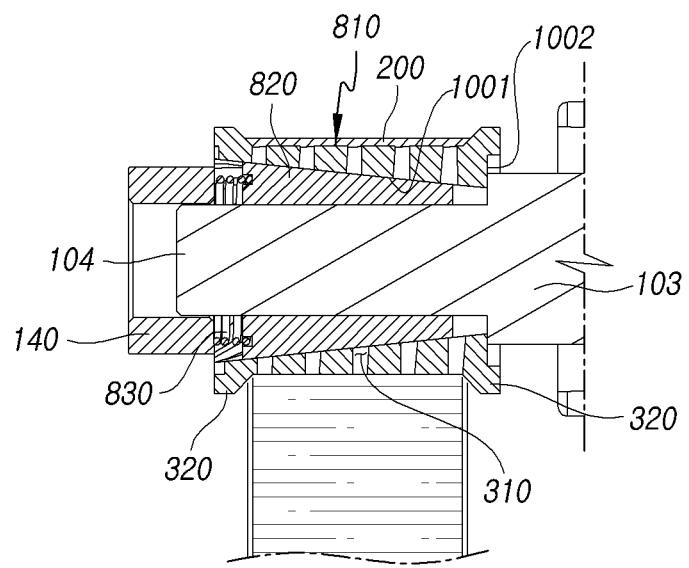
FIG. 10 is a cross-sectional view of a part of a motor assembly according to the present embodiments.
Figure 11:
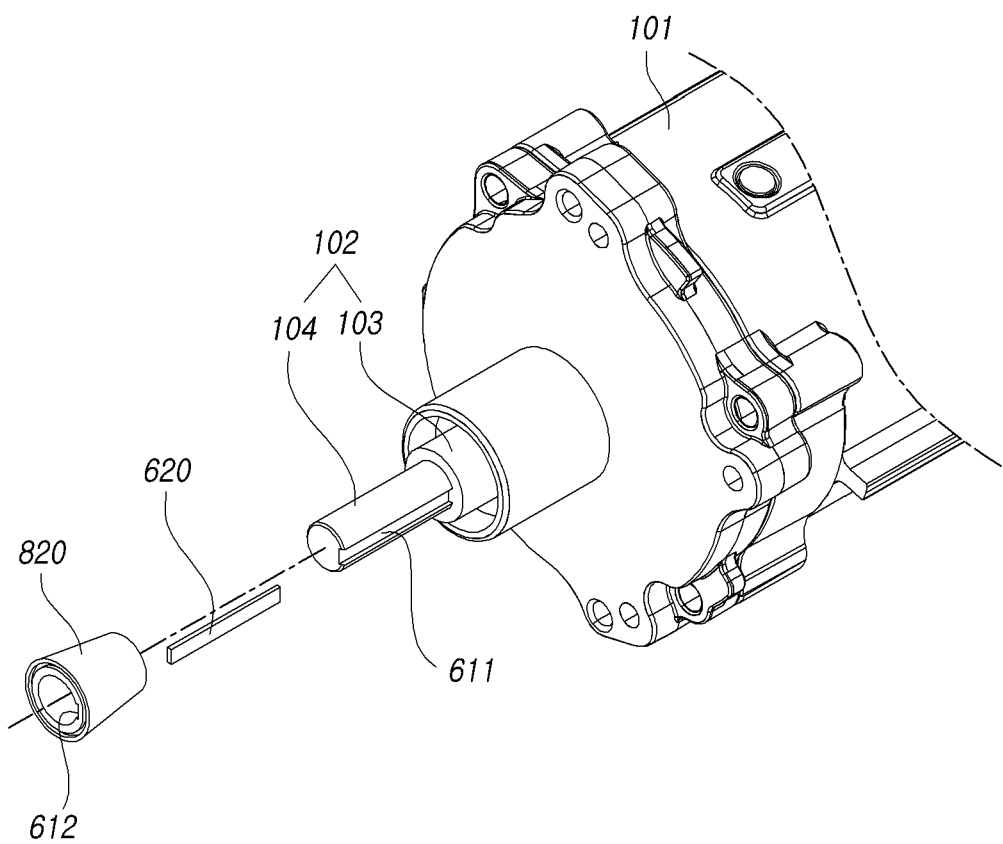
FIG. 11 is an exploded perspective view of a part of a motor assembly according to the present embodiments.
Figure 12:
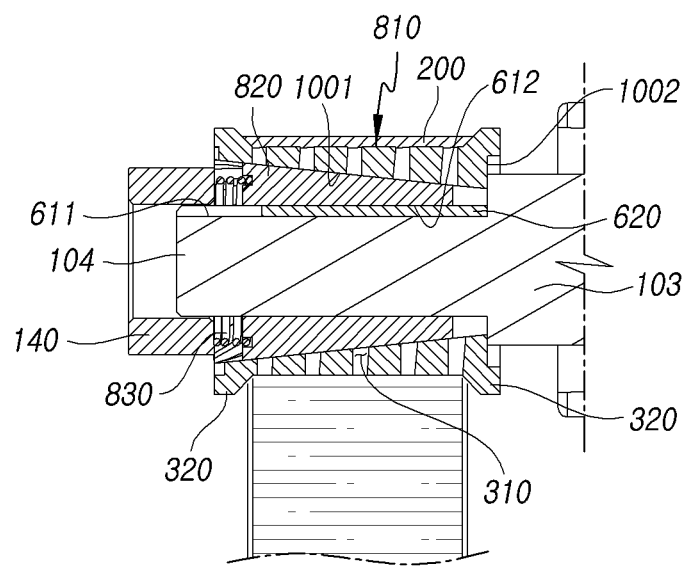
FIG. 12 is a cross-sectional view of a part of a motor assembly according to the present embodiments.
Figure 13:
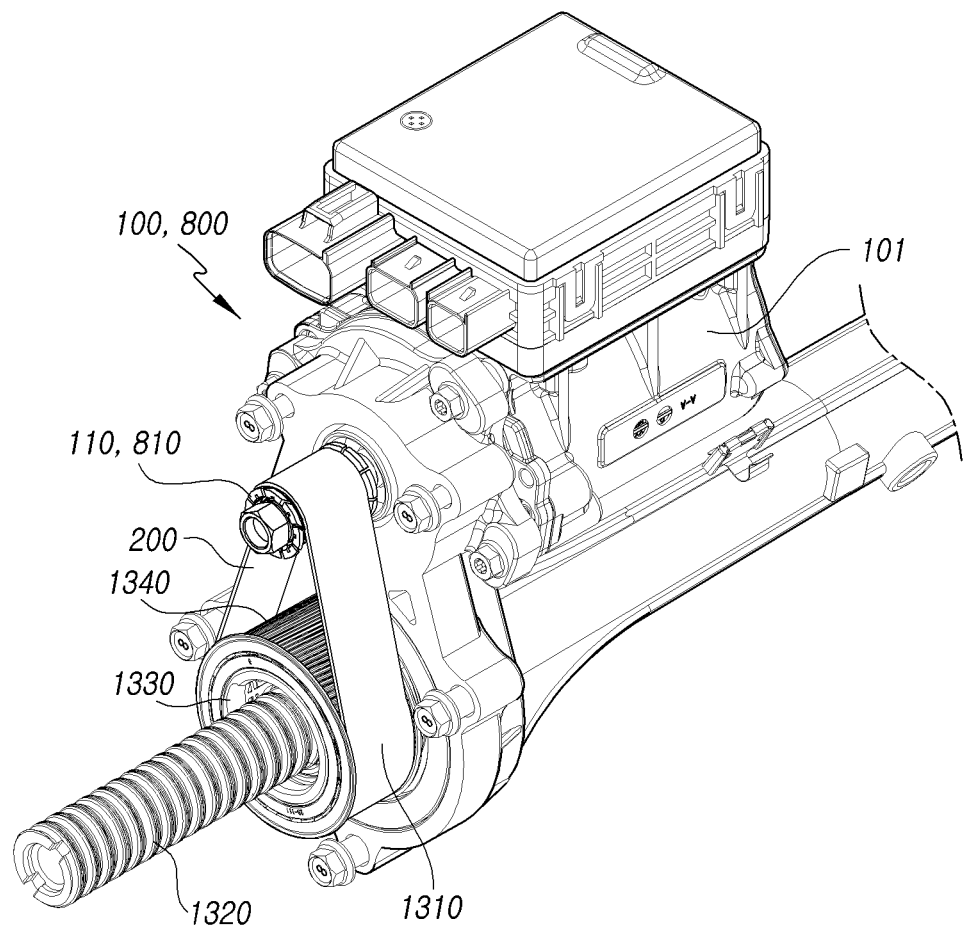
FIGS. 13 to 14 are perspective views of a steering apparatus for a vehicle according to the present embodiments.
Figure 14:
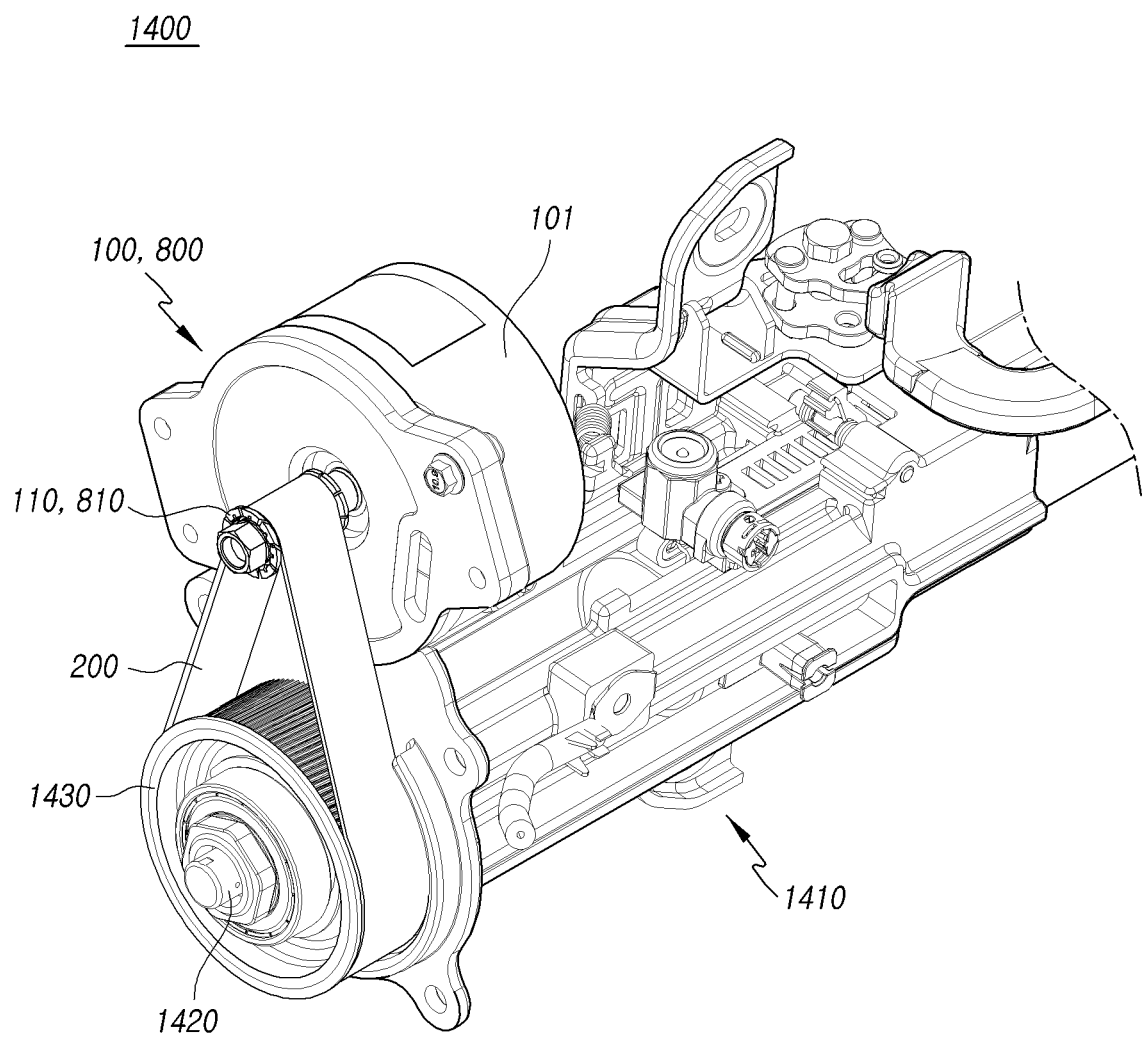

FIG. 1 is an exploded perspective view of a motor assembly according to the present embodiments, FIG. 2 is a perspective view illustrating an example of use of a motor assembly according to the present embodiments, FIGS. 3 to 4 are perspective views of a part of a motor assembly according to the present embodiments, FIG. 5 is a cross-sectional view of a part of a motor assembly according to the present embodiments, FIG. 6 is an exploded perspective view of a part of a motor assembly according to the present embodiments, FIG. 7 is a cross-sectional view of a part of a motor assembly according to the present embodiments, FIG. 8 is an exploded perspective view of a motor assembly according to the present embodiments, FIG. 9 is an exploded perspective view of a part of a motor assembly according to the present embodiments, FIG. 10 is a cross-sectional view of a part of a motor assembly according to the present embodiments, FIG. 11 is an exploded perspective view of a part of a motor assembly according to the present embodiments, FIG. 12 is a cross-sectional view of a part of a motor assembly according to the present embodiments, and FIGS. 13 to 14 are perspective views of a steering apparatus for a vehicle according to the present embodiments.

First, it will be described an embodiment of the present disclosure with reference to FIGS. 1 to 7.

According to an embodiment, there may be provided a motor assembly 100 including a motor 101 including a motor shaft 102 including a large-diameter portion 103 and a small-diameter portion 104 extending from one end of the large-diameter portion, a first support member 121 formed in a hollow and provided on a first side of an outer surface of the small-diameter portion 104, and an outer diameter of which decreases from one side to another side, a second support member 122 formed in a hollow shape and provided on a second side of the outer surface of the small-diameter portion 104, and an outer diameter of which increases from one side to another side, a pulley 110 which is formed in a hollow shape, includes a plurality of slits 310 for cutting an inner surface and an outer surface, and includes, in the inner surface, a first tapered surface 511 supported on an outer surface of the first support member 121 and a second tapered surface 512 supported on an outer surface of the second support member 122, a nut 140 coupled to one end of the small-diameter portion 104, a first elastic member 131 provided between the nut 140 and the first support member 121, and a second elastic member 132 provided between the second support member 122 and the large-diameter portion 103.

Referring to FIGS. 1 to 2, a belt 200 is supported on the outer surface of the pulley 110, as the belt 200 rotates, and the torque of the motor 101 is transmitted to the driven part. The pulley 110 may be formed to be elastically deformed in the radial direction, and to be enlarged or reduced in diameter. The pulley 110 is enlarged by an elastic force of the first elastic member 131 and the second elastic member 132, so that the belt 200 is pressed and the tension of the belt 200 can be maintained.

Referring to FIG. 3, the pulley 110 is formed in a hollow shape, and a plurality of slits 310 for cutting the inner and outer surfaces are formed in the pulley 110. The slit 310 includes a first slit 311 formed from one end of the pulley 110 toward another end of the pulley 110 and a second slit 312 formed from the another end of the pulley 110 toward the end of the pulley 110.

The first slit 311 and the second slit 312 may be alternately provided. Therefore, the first slit 311 and the second slit 312 may be elastically deformed to increase or decrease the width thereof, so that the pulley 110 can be enlarged or reduced in diameter.

As shown in FIG. 3, the first slit 311 and the second slit 312 may be formed parallel to an axial direction. Alternatively, as shown in FIG. 4, the first slit 311 and the second slit 312 may be formed in a spiral shape.

In both cases in which the first slit 311 and the second slit 312 are formed parallel to the axial direction and formed in a spiral shape, the pulley 110 may be enlarged in diameter to press the belt 200. In the case that the first slit 311 and the second slit 312 are formed is spiral shapes, the rib of the pulley 110 provided between the first slit 311 and the second slit 312 may be supported by the belt 200 at a wider angle in the circumferential direction, so that it is possible to press the belt 200 more stably.

Referring to FIG. 1 and FIG. 5, the first support member 121 and the second support member 122 are inserted into the inner surface of the pulley 110 from one side and another side, respectively. The first elastic member 131 and the second elastic member 132 elastically support the first support member 121 and the second support member 122, respectively. Accordingly, the belt 200 is pressed in a direction in which the pulley 110 is enlarged by the elastic force of the first elastic member 131 and the second elastic member 132.

The motor shaft 102 of the motor 101 includes a small-diameter portion 104 and a large-diameter portion 103. The small-diameter portion 104 is provided to extend from one end of the large-diameter portion 103. The nut 140 is coupled to one end of the small-diameter portion 104, and the first elastic member 131, the first support member 121, the pulley 110, the second support member 122 and the second elastic member 132 are coupled to the motor shaft 102.

The first support member 121 and the second support member 122 are formed in a hollow shape, and are provided on a first side and a second side of the outer surface of the small-diameter portion 104, respectively.

The first support member 121 is formed with an outer diameter decreasing from one side to another side. The second support member 122 is formed with an outer diameter increasing from one side to another side. That is, the first support member 121 and the second support member 122 may be symmetrically formed in a direction facing each other.

In the inner surface of the pulley 110, there may be provided a first tapered surface 511 supported on the outer surface of the first support member 121 and a second tapered surface 512 supported on the outer surface of the second support member 122.

That is, the inner diameter of the pulley 110 in the portion where the first tapered surface 511 is formed decreases from one side to another side. In the portion where the second tapered surface 512 is formed, the inner diameter of the pulley 110 is formed to increase from one side to another side. The inner surface of the pulley 110 may have an approximately v-shape.

The first elastic member 131 is provided between the nut 140 and the first support member 121, is supported by the nut 140, and presses the first support member 121. The second elastic member 132 is provided between the second support member 122 and the large-diameter portion 103, is supported by the large-diameter portion 103, and presses the second support member 122.

In one side of the first support member 121 and another side of the second support member 122, there may be provided a groove recessed in the axial direction for seating the first elastic member 131 and the second elastic member 132, respectively.

Accordingly, the first support member 121 and the second support member 122 are pressed in a direction facing each other by the first elastic member 131 and the second elastic member 132, respectively. Since the first support member 121 and the second support member 122 are supported by the first tapered surface 511 and the second tapered surface 512 of the pulley 110, respectively, the belt 200 is pressed in the direction in which the pulley 110 is enlarged, and the tension of the belt 200 is maintained.

In addition, the first elastic member 131 and the second elastic member 132 may be compressed or tensioned by moving the nut 140 forward or backward. Accordingly, it is possible to easily adjust the tension of the belt 200 by adjusting the elastic force of the first elastic member 131 and the second elastic member 132.

Meanwhile, in order to rotate the belt 200 by the rotation of the motor shaft 102 without loss of torque, it is required to prevent the slip between the small-diameter portion 104 and the inner surface of the first support member 121 and the second support member 122, between the outer surface of the first support member 121 and the second support member 122 and the pulley 110, and between the outer surface of the pulley 110 and the belt 200.

First, although not shown in the figures, serrations may be formed on the small-diameter portion 104 and the inner surfaces of the first support member 121 and the second support member 122. That is, the first support member 121 and the second support member 122 are coupled to the small-diameter portion 104 to be slidable in the axial direction but fixed in the circumferential direction to prevent the slip.

As shown in FIGS. 6 to 7, a first groove 611 elongated in the axial direction may be formed on the outer surface of the small-diameter portion 104, and a second groove 612 elongated in the axial direction may be formed on the inner surface of the second support member 122. A support pin 620 is inserted into the first groove 611 and the second groove 612, and the first support member 121 and the second support member 122 are fixed to the small-diameter portion 104 in the in the circumferential direction so as to prevent the slip.

That is, the support pin 620 is formed in a substantially rod shape, the radially inner portion of the support pin 620 is inserted into the first groove 611 and is supported in the circumferential direction by the small-diameter portion 104. The radially outer portion of the support pin 620 is inserted into the second groove 612 and is supported by the first support member 121 and the second support member 122 in the circumferential direction.

To facilitate coupling in the axial direction, the first groove 611 may be formed to open up to one end of the small-diameter portion 104. The second groove 612 may be formed to be opened from the first support member 121 and the second support member 122 to both ends, respectively.

In addition, the first support member 121, the second support member 122, and the pulley 110 may be made of a high friction material, so that there may be prevented the slip between the outer surfaces of the first and second support members 121 and 122 and the inner surface of the pulley 110.

That is, the first support member 121 and the second support member 122 are in close contact with the first tapered surface 511 and the second tapered surface 512, respectively, by the elastic force of the first elastic member 131 and the second elastic member 132. In addition, the first tapered surface 511 and the second tapered surface 512 are in close contact with the first support member 121 and the second support member 122 by the restoring force of the pulley 110. Accordingly, there may be prevented the slip by manufacturing the first support member 121 and the second support member 122 and the pulley 110 with a high friction material.

In addition, similarly to the support pin 620, the first groove 611 and the second groove 612, a groove may be formed on the inner circumferential surface of the pulley 110 and the outer circumferential surfaces of the first support member 121 and the second support member 122 so as to fix in the circumferential direction by inserting a pin. In this case, the depth of the groove or the thickness of the pin is required to be designed based on the enlarged diameter of the pulley 110.

In addition, it is also possible to prevent slip between the outer surface of the pulley 110 and the belt by using a toothed belt and forming a groove meshing with the teeth of the belt on the outer peripheral surface of the pulley 110. Alternatively, slip may be prevented by increasing the area in which the pulley 110 and the belt are supported.

Referring to FIG. 5 and FIG. 7, one end and another end of the pulley 110 are provided with a stepped portion 320 protruding in a radial direction to prevent the belt 200 from being separated. The stepped portion 320 is formed to protrude in a tapered manner, and a v-shaped belt supported on the tapered surface of the stepped portion 320 is used as the belt 200, so that it is possible to prevent the slip by increasing the area in which the outer peripheral surface of the pulley 110 and the belt 200 are supported.

Hereinafter, it will be described an embodiment of the present disclosure with reference to FIGS. 8 to 12.

According to an embodiment, there may be provided a motor assembly including a motor 101 including a motor shaft 102 including a large-diameter portion 103 and a small-diameter portion 104 extending from one end of the large-diameter portion 103, a support member 820 formed in a hollow shape and provided on an outer surface of the small-diameter portion 104, the outer diameter of which decreases from one side to another side, a pulley 810 which is formed in a hollow shape, includes a plurality of slits 310 for cutting an inner surface and an outer surface, and includes, in the inner surface, a tapered surface 1001 supported on an outer surface of the support member 820 and a step portion 1002 formed with a diameter enlarged at an end of the tapered surface 1001 and supported by the large-diameter portion 103, a nut 140 coupled to one end of the small-diameter portion 104, and an elastic member 830 provided between the nut 140 and the support member 820.

Compared with the embodiments shown in FIGS. 1 to 7, in the embodiments shown in FIGS. 8 to 12, one support member 820 and one elastic member 830 are provided, respectively, and one tapered surface 1001 is also provided on the inner surface of the pulley 810.

The same reference numerals are used for the same components as in the above-described embodiments, and detailed descriptions thereof will be omitted.

A plurality of slits 310 for cutting the inner and outer surfaces are formed in the pulley 810 formed in a hollow shape, the pulley 810 is enlarged by the elastic force of the elastic member 830, so that the belt is pressed and the tension of the belt is maintained.

The slit 310 includes a first slit 311 formed from an end of the pulley 810 toward another end, and a second slit 312 formed from the another end of the pulley 810 toward the end of the pulley 810.

The first slit 311 and the second slit 312 may be provided alternately, and the first slit 311 and the second slit 312 may be formed parallel to the axial direction (refer to FIG. 8) or may be formed in a spiral shape (refer to FIG. 9).

Referring to FIGS. 8 and 10, the support member 820 is inserted into the inner surface of the pulley 810 from one side. The elastic member 830 elastically supports the support member 820 so that the belt is pressed in a direction in which the pulley 810 is enlarged by the elastic force of the elastic member 830.

The support member 820 is formed to be hollow and is provided on the outer surface of the small-diameter portion 104, and the outer diameter of the support member decreases from one side to another side.

The inner peripheral surface of the pulley 810 is provided with a tapered surface 1001 supported on the outer surface of the support member 820. That is, in the portion where the tapered surface 1001 is formed, the inner diameter of the pulley 810 is formed to decrease from one side to another side.

In addition, the inner peripheral surface of the pulley 810 is provided with a step portion 1002 supported on the large-diameter portion 103 of the motor shaft 102. The step portion 1002 is formed by being enlarged in the diameter at an end of the tapered surface 1001.

That is, since the end of the tapered surface 1001 is a portion where the inner diameter of the pulley 810 is minimized, the step portion 1002 is formed by being enlarged from the inner peripheral surface of the pulley 810 at the another side.

The step portion 1002 is supported by the large-diameter portion 103 and the another side of the pulley 810 is supported by the motor shaft 102 in the axial direction. The elastic member 830 provided between the nut 140 and the support member 820 presses the support member 820 against the nut 140. The belt is pressed in the direction in which the pulley 810 is enlarged and the tension of the belt is maintained.

Accordingly, since the elastic member 830 may be compressed or tensioned by moving the nut 140 forward or backward, it is possible to easily adjust the tension of the belt by adjusting the elastic force of the elastic member 830.

Meanwhile, similarly, a serration may be formed to prevent slip between the small-diameter portion 104 and the inner circumferential surface of the support member 820. Alternatively, as shown in FIGS. 11 to 12, a first groove 611 elongated in the axial direction may be formed on the outer surface of the small-diameter portion 104 and a second groove 612 elongated in the axial direction may be formed on the inner surface of the support member 820. Accordingly, the support member 820 may be fixedly coupled to the small-diameter portion 104 in the circumferential direction by the support pin 620 inserted into the first groove 611 and the second groove 612, thereby preventing the slip.

In addition, by manufacturing the support member 820 and the pulley 810 with a high friction material, there may be prevented the slip between the outer circumferential surface of the support member 820 and the inner circumferential surface of the pulley 810 by frictional force.

The support member and the pulley may be fixed in the circumferential direction by forming a groove on the outer surface of the support member 820 and the inner surface of the pulley 810 and inserting a pin thereto.

In addition, it is possible to prevent the slip by using a toothed belt and forming a groove on the outer circumferential surface of the pulley 810 engaged with the tooth of the belt. Alternatively, in order to prevent separation of the belt, a stepped portion 320 protruding radially from one end and another end of the pulley 810 may be formed to protrude in a tapered manner, and a v-shaped belt may be used, so that it is also possible to prevent the slip by increasing the area in which the pulley 810 and the belt 200 are supported.

According to the motor assembly having such a configuration, the tension of the belt can be easily adjusted by moving the nut forward or backward, so that the belt tension adjustment process can be simplified.

Hereinafter, it will be described an embodiment of the present disclosure with reference to FIG. 13.

According to an embodiment, there may be provided a steering apparatus 1300 of a vehicle including a motor assembly 100 or 800, a sliding bar 1320 having both ends connected to a tie rod and a knuckle arm, a housing 1310 accommodating the sliding bar 1320 and coupled to a motor 101, a ball nut 1330 coupled to an outer surface of the sliding bar 1320 via a ball and coupled to a driven pulley 1340, and a belt 200 coupled to a pulley 110 or 810 and the driven pulley 1340.

The steering apparatus 1300 for a vehicle shown in FIG. 13 may be a part of a rack-driven power-assisted steering apparatus or a steer-by-wire steering apparatus, and the sliding bar 1320, the ball nut 1330, the driven pulley 1340, and the like are generally the same as those known, and thus detailed descriptions thereof will be omitted.

That is, the motor assembly 100 according to the embodiments shown in FIGS. 1 to 7 or the motor assembly 800 according to the embodiments shown in FIGS. 8 to 12 may be installed in the housing 1310, so that the driver's manipulation of the steering wheel may be assisted by the torque of the motor 101 or the wheel may be steered to correspond to the driver's manipulation of the steering wheel. It is possible to easily adjust the tension of the belt 200 connecting the pulleys 110 or 810 and the driven pulley 1340 by moving the nut 140 forward or backward.

Hereinafter, it will be described an embodiment of the present disclosure with reference to FIG. 14.

According to an embodiment, there may be provided a steering apparatus 1400 including a motor assembly 100 or 800, a steering column 1410 including a steering shaft 1420 and coupled to a motor 101, a driven pulley 1430 coupled to the steering shaft 1420, and a belt 200 coupled to a pulley 110 or 810 and the driven pulley 1430.

The steering apparatus 1400 for a vehicle shown in FIG. 14 may be a part of a steer-by-wire steering apparatus, and the steering shaft 1420, the steering column 1410, the driven pulley 1430, and the like are generally the same as those known, and thus detailed descriptions thereof will be omitted.

That is, the motor assembly 100 according to the embodiments shown in FIGS. 1 to 7 or the motor assembly 800 according to the embodiments shown in FIGS. 8 to 12 may be is installed in the steering column 1410. As a result, it is possible to apply a steering reaction force to the steering shaft 1420, and improve the steering feeling of the driver. In addition, it is also possible to easily adjust the tension of the belt 140 connecting the pulleys 110 or 810 and the driven pulley 1430 by moving the nut 140 forward or backward.

However, in addition to the embodiments shown in FIGS. 13 to 14, the motor assemblies 100 and 800 according to the present embodiments may be applied to other types of steering apparatus having a structure for transferring torque of the motor using a belt.

According to the steering apparatus of a vehicle having such a configuration, there is no need to assemble the motor eccentrically as in the general steering system, and there is no need to rotate the motor in a state coupled to the housing in order to adjust the tension of the belt. Accordingly, it is possible to simplify the motor installation structure and assembly process, and share motors between vehicle models without risk of interference with surrounding.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A motor assembly comprising:
   a motor including a motor shaft including a large-diameter portion and a small-diameter portion extending from one end of the large-diameter portion;
   a first support member formed in a hollow shape and provided on a first side of an outer surface of the small-diameter portion, the first support member having an outer diameter decreasing from one side to another side;
   a second support member formed in a hollow shape and provided on a second side of the outer surface of the small-diameter portion, the second support member having an outer diameter increasing from one side to another side;
   a pulley formed in a hollow shape and including a plurality of slits extending from an inner surface of the pulley to an outer surface of the pulley, the inner surface of the pulley including a first tapered surface supported on an outer surface of the first support member and a second tapered surface supported on an outer surface of the second support member;
   a nut coupled to one end of the small-diameter portion;
   a first elastic member provided between the nut and the first support member; and
   a second elastic member provided between the second support member and the large-diameter portion,
   wherein
   a first groove is formed on the outer surface of the small-diameter portion and is elongated in an axial direction of the small-diameter portion,
   the first groove is open up to the one end of the small-diameter portion,
   a second groove is formed on an inner surface of the first support member and on an inner surface of the second support member,
   the second groove continuously extends in the axial direction from an end of the first support member to an end of the second support member adjacent to the first support member in the axial direction, and
   a support pin is inserted into the first groove and the second groove in the axial direction.

2. The motor assembly of claim 1, wherein
the pulley includes a first end and a second end opposite to the first end,
the plurality of slits comprises a first slit extending from the first end of the pulley toward the second end, and a second slit extending from the second end of the pulley toward the first end.

3. The motor assembly of claim 2, wherein the first slit and the second slit are alternately provided.

4. The motor assembly of claim 2, wherein the first slit and the second slit are formed in a spiral shape.

5. The motor assembly of claim 1, wherein
the pulley includes a first end and a second end opposite to the first end,
each of the first end and the second end of the pulley is provided with a stepped portion protruding in a radial direction of the pulley.

6. The motor assembly of claim 5, wherein the stepped portion protrudes in a tapered manner.

7. A steering apparatus of a vehicle comprising a motor assembly according to claim 1.

8. A motor assembly comprising:
a motor including a motor shaft including a large-diameter portion and a small-diameter portion extending from one end of the large-diameter portion;
a support member formed in a hollow shape and provided on an outer surface of the small-diameter portion, the support member having an outer diameter decreasing from one side to another side;
a pulley formed in a hollow shape and including a plurality of slits extending from an inner surface of the pulley to an outer surface of the pulley, the inner surface of the pulley including a tapered surface supported on an outer surface of the support member and a step portion formed with a diameter enlarged at an end of the tapered surface and supported by the large-diameter portion;
a nut coupled to one end of the small-diameter portion; and
an elastic member provided between the nut and the support member,
wherein
a first groove is formed on the outer surface of the small-diameter portion and is elongated in an axial direction of the small-diameter portion,
the first groove is open up to the one end of the small-diameter portion,
a second groove is formed on an inner surface of the first support member and on an inner surface of the second support member,
the second groove continuously extends in the axial direction from an end of the first support member to an end of the second support member adjacent to the first support member in the axial direction, and
a support pin is inserted into the first groove and the second groove in the axial direction.

9. The motor assembly of claim 8, wherein
the pulley includes a first end and a second end opposite to the first end,
the plurality of slits comprises a first slit extending from the first end of the pulley toward the second end, and a second slit extending from the second end of the pulley toward the first end.

10. The motor assembly of claim 9, wherein the first slit and the second slit are alternately provided.

11. The motor assembly of claim 9, wherein the first slit and the second slit are formed in a spiral shape.

12. The motor assembly of claim 8, wherein
the pulley includes a first end and a second end opposite to the first end,
each of the first end and the second end of the pulley is provided with a stepped portion protruding in a radial direction of the pulley.

13. The motor assembly of claim 12, wherein the stepped portion protrudes in a tapered manner.

* * * * *